(12) United States Patent
Patel et al.

(10) Patent No.: US 9,187,038 B2
(45) Date of Patent: Nov. 17, 2015

(54) DASHBOARD INCLUDING RULES TO DISPLAY DATA

(75) Inventors: Rikin Patel, Sterling Heights, MI (US); William E. Bejcek, Spruce, MI (US); David J. Nowaczyk, Howell, MI (US); Alejandro Anzures Rueda, Guadalajara Jalisco (MX)

(73) Assignee: Hewlett-Packard Development Company, L.P., Houston, TX (US)

(*) Notice: Subject to any disclaimer, the term of this patent is extended or adjusted under 35 U.S.C. 154(b) by 199 days.

(21) Appl. No.: 13/822,374

(22) PCT Filed: Oct. 13, 2010

(86) PCT No.: PCT/US2010/052430
§ 371 (c)(1),
(2), (4) Date: Mar. 12, 2013

(87) PCT Pub. No.: WO2012/050573
PCT Pub. Date: Apr. 19, 2012

(65) Prior Publication Data
US 2013/0207794 A1    Aug. 15, 2013

(51) Int. Cl.
G08B 21/00 (2006.01)
B60R 1/00 (2006.01)
B60K 35/00 (2006.01)

(52) U.S. Cl.
CPC . B60R 1/00 (2013.01); B60K 35/00 (2013.01); B60K 2350/901 (2013.01); B60K 2350/908 (2013.01)

(58) Field of Classification Search
CPC .................................................. B60K 2350/908
USPC ................... 340/425.5, 438, 461, 462; 701/1; 345/30
See application file for complete search history.

(56) References Cited

U.S. PATENT DOCUMENTS

| 6,812,942 | B2 | 11/2004 | Ribak |
| 6,871,121 | B2 | 3/2005 | Tomson |
| 6,972,665 | B2 | 12/2005 | Wang et al. |
| 7,441,189 | B2 | 10/2008 | Michaels |
| 7,683,771 | B1 | 3/2010 | Loeb |
| 2004/0186936 | A1 | 9/2004 | Wang et al. |
| 2009/0273574 | A1 | 11/2009 | Pryor |
| 2010/0127847 | A1 | 5/2010 | Evans et al. |

FOREIGN PATENT DOCUMENTS

| JP | H10-208194 | 8/1998 |
| JP | 2001-121989 | 5/2001 |
| JP | 2005-164465 | 6/2005 |
| JP | 2006053132 | 2/2006 |
| JP | 2009159122 | 7/2009 |
| JP | 2010-009623 | 1/2010 |
| JP | 2010009623 | 1/2010 |
| JP | 2010136286 | 6/2010 |
| JP | 2010-147995 | 7/2010 |
| KR | 10-2007-0077663 A | 7/2007 |

*Primary Examiner* — Jeffery Hofsass
(74) *Attorney, Agent, or Firm* — Hewlett-Packard Patent Department (57) ABSTRACT

According to one example of the present invention, there is provided apparatus for displaying a dashboard display in a vehicle. The apparatus comprises a vehicle data bus interface for communicating with vehicle subsystems of a vehicle management system, a rules store for storing a set of dashboard display rules, and a dashboard display module. The dashboard display module is arranged to obtain a dashboard display definition, to determine whether the dashboard display definition is in compliance with the dashboard display rules; to obtain, where it is so determined, data from one or more of the vehicle subsystems in accordance with the dashboard display definition, and to display the obtained data in accordance with the dashboard display definition.

20 Claims, 6 Drawing Sheets

DASHBOARD INCLUDING RULES TO DISPLAY DATA

BACKGROUND

The interior design and layout of motor and other vehicles is largely fixed when a vehicle is manufactured. Consequently, the layout and design of a vehicle dashboard, including the position and design of vehicle instruments, such as speedometer, odometer, engine rev counter, and other vehicle displays and controls, is generally not changeable by a vehicle owner. Interior design changes by the manufacturer on production models may require significant re-design, testing, production line modifications, re-tooling, supplier changes, and so on. Consequently, the interior designs of vehicles are seldom changed once the vehicle has been manufactured.

At the same time, however, people generally have an increasing desire for personalization of the objects they possess. For example, in the world of mobile telephones there is a huge after-market in user-replaceable 'fashion' cases and downloadable ringtones which enable a mobile telephone to be substantially personalized. Currently, however, vehicle interiors do not generally allow any degree of personalization.

BRIEF DESCRIPTION

Examples and embodiments of the invention will now be described, by way of non-limiting examples only, with reference to the accompanying drawings, in which.

DETAILED DESCRIPTION

Figure 1:
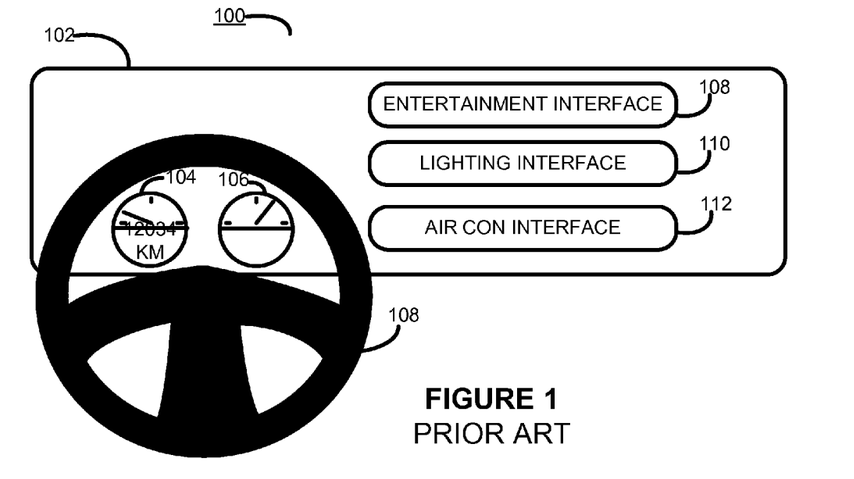
FIG. 1 is a simplified block diagram illustrating a portion of a vehicle dashboard according to the prior art.

Referring now to FIG. 1 there is shown a simplified diagram illustrating a portion of a vehicle dashboard 100, such as a car or lorry dashboard, according to the prior art.

The dashboard 100 comprises a console area 102 in which are placed a number of different vehicle instruments, displays, and controls. As is typical in many vehicles, a number of vehicle instruments 104 and 106 are situated on the console 102, typically behind the vehicle steering wheel 108. For example, the instrument 104 may show the vehicle speed, and the instrument 106 may show the fuel reservoir level or the engine speed. The console area 102 may also comprises a number of other instruments (not shown) for showing other vehicle data as well as one or more interfaces to enable the control and/or monitoring of different ones of the vehicles subsystems. For example, an entertainment interface 108 enables an occupant of the vehicle to operate and/or monitor the in-vehicle entertainment subsystem, a lighting interface 110 enables an occupant to operate and/or monitor the vehicle lighting subsystems, and an air-conditioning interface 112 enables an occupant to monitor and/or to control the vehicle heating and cooling subsystem. Other subsystem interfaces may also be provided.

Figure 2:
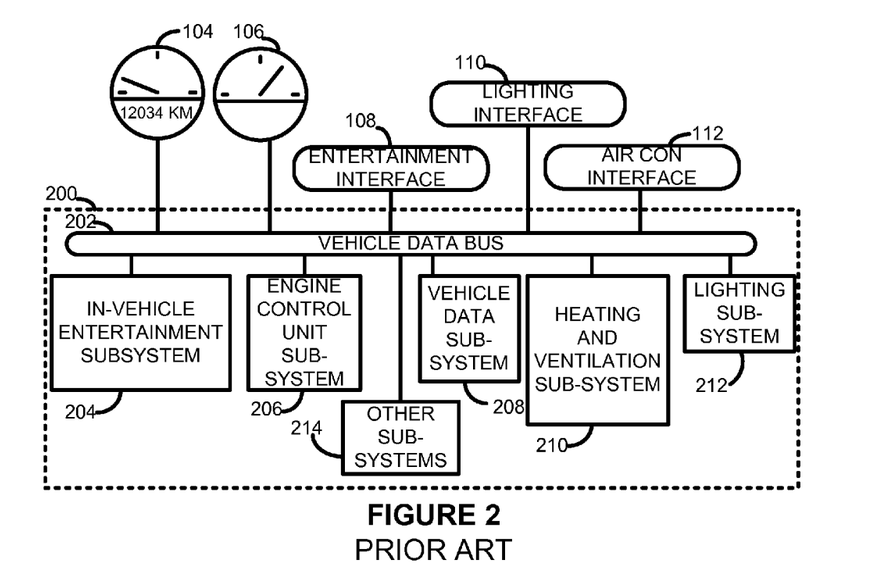
FIG. 2 is a simplified block diagram illustrating a vehicle management system according to the prior art.

FIG. 2 shows a simplified block diagram illustrating how the instruments 104 and 106 and interfaces 108, 110, and 112, may be connected to a vehicle management system 200 according to the prior art. The vehicle management system 200 includes a vehicle data bus 202 to which different ones of the vehicle's computer or control subsystems are coupled or connected. FIG. 2 shows an in-vehicle entertainment subsystem 204, an engine control unit subsystem 206, a vehicle data subsystem 208, a heating and ventilation subsystem 210, a lighting subsystem 212, and other vehicle subsystems 214.

The instruments 104 and 106 display, for example, speed, odometer, and fuel reserve data obtained from the vehicle data subsystem 208. The entertainment interface 108 provides control signals to the in-vehicle entertainment subsystem 204 in response to user activation of elements of the interface 108. For example, the entertainment interface may be provided by physical buttons and switches. Display information may be supplied by the in-vehicle entertainment subsystem to the entertainment interface 108 for display thereby. The lighting interface 110 may provide physical controls by which a user can control the vehicle lighting subsystem and may also provide visual indicators, for example in the form of lamps, lights, or other display technology, showing the status of different elements of the vehicle lighting subsystem. The air conditioning interface 112 may also provide physical controls by which a user can control the vehicle heating and ventilation subsystem and may also provide visual indications of the status of different elements of the vehicle heating and ventilation subsystem. Other interfaces (not shown) may be provided for visualizing the status of and controlling other vehicle subsystems 214.

One of the problems, however, with conventional vehicle dashboard design is that the instruments and interfaces and physical interfaces are built into the vehicle dashboard when the vehicle is manufactured. Electrical wires are needed between each input button or switch and each display element in each interface. Furthermore, each instrument is carefully designed to ensure that its placement on the dashboard gives the operator of the vehicle a clear view of the instrument, and in certain cases, such as for the speedometer, its size, position, labeling, and design may, in some instances, be governed by laws. Accordingly, access to the vehicle data bus is only intended for and is only provided for the instruments and interfaces incorporated into the dashboard 100 when the vehicle is manufactured.

Consequently, the options for personalization of the dashboard are somewhat limited.

Examples of the present invention, however, aim to provide a level of vehicle interior personalization by making available access to at least some of the vehicles subsystems via a vehicle data access management module. In this way, a user computing device, such as a portable computing device, may be connected to a vehicle data access management module, and may subsequently receive data from and/or send control signals to different ones of the vehicle subsystems through a user interface provided through the user computing device. For example, in one example a display element of a user computing device may be used for displaying instruments for showing vehicle data as well for displaying and providing control interfaces. In a further example, an external display may be connected to a user computing device and be used for displaying vehicle data and control interfaces. In a yet further example, an external display may be connected to a vehicle computing system and be used for displaying vehicle data and control interfaces.

To ensure compliance with either manufacturer display guidelines or external regulations, an enforcement engine may be provided in the user computing device to assure compliance.

Figure 3A:
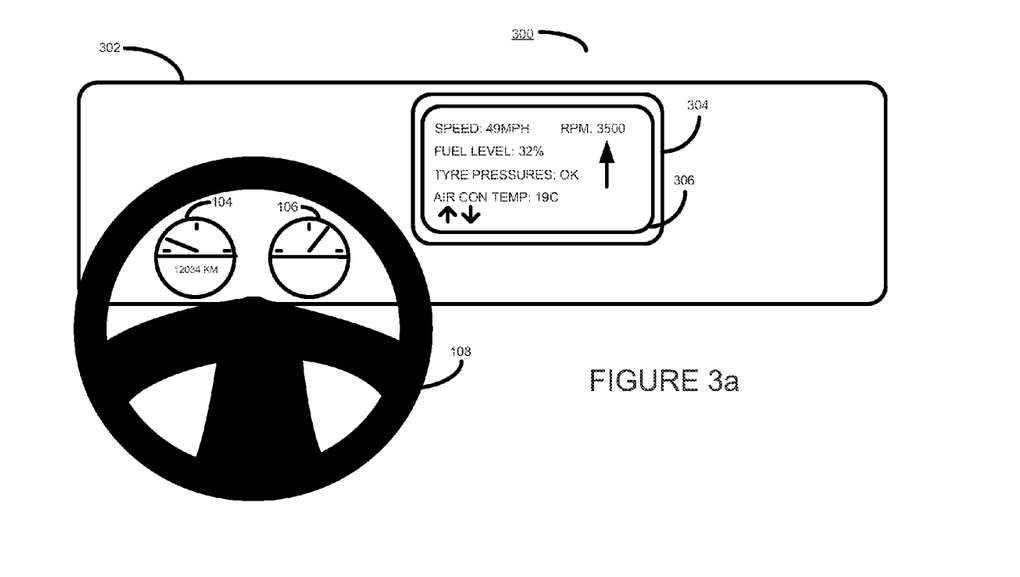
FIG. 3a is a simplified block diagram illustrating a portion of a vehicle dashboard according to an example of the present invention.

Referring now to FIG. 3a there is a shown a simplified diagram illustrating a portion of a vehicle dashboard arrangement 300 according to an example of the present invention. In the present example, a computing device 304 is removably connected to the vehicle dashboard, or other suitable part of the vehicle, such that an occupant of the vehicle, such as the driver, may view the computing device's display 306. The computing device 304 may be a computing device such as a portable computer, a net-book computer, a slate computer, a pad computer, a portable radio telephone, a personal digital assistant, or any other type of suitable computing device.

Figure 3B:
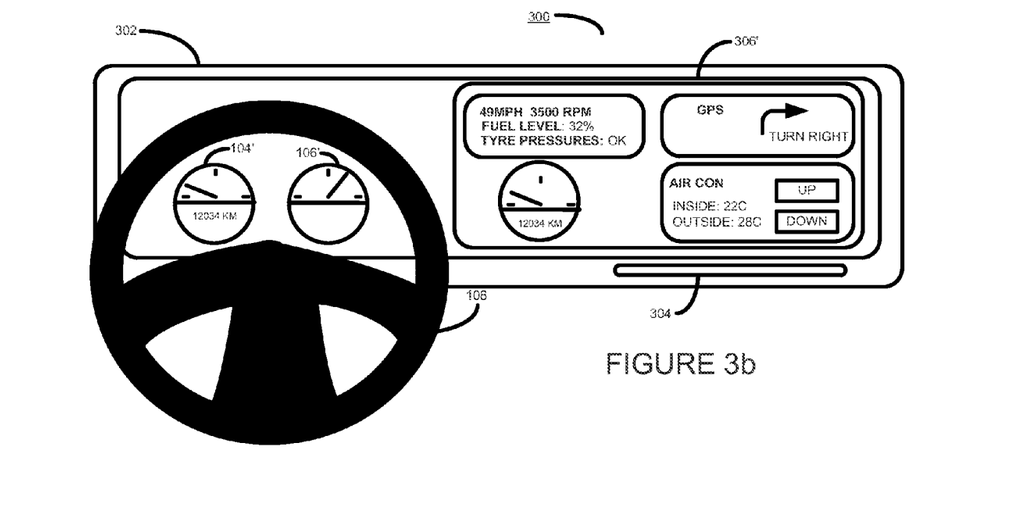
FIG. 3b is a simplified block diagram illustrating a portion of a vehicle dashboard according to an example of the present invention.

Referring now to FIG. 3b there is shown a simplified diagram illustrating a portion of a vehicle dashboard arrangement 300 according to a further example of the present invention. In this example, a computing device 304 is removably connected to the vehicle dashboard 302, or other suitable part of the vehicle. The computing device 304 may be a computing device such as a portable computer, a net-book computer, a slate computer, a pad computer, a portable radio telephone, a personal digital assistant, or any other type of suitable computing device. A display element 306' is connected to the computing device 304 through a suitable connection (not shown) to enable vehicle instruments and control interfaces to be displayed thereon. In at least some examples the display element 306' is removably attachable to the console 302.

As shown in FIG. 3b, the display element 306' extends across substantially the whole of the dashboard 302, although it will be appreciated that larger or smaller displays may be used in other examples. The display element 306 may be any suitable display, including, for example, an LCD monitor, an LED monitor, a flexible display, an electronic ink display, a touch-sensitive display, a 3-dimensional display, or the like.

The computing device 304 interacts with different ones of the in-vehicle subsystems 202 to 214 and enables a personalized or user dashboard display to be created and displayed on the display 306 or 306'. The personalized dashboard display may enable an occupant of the vehicle to visualize vehicle data, for example in the form of graphical or textual vehicle instruments, and to visualize the status of and to control different ones of the vehicle sub-systems. In one example, the display 306 or 306' generates control signals in response to the display being touched or by gestures being made on or near thereto. The display element 306 or 306' may thus receive user inputs which in turn may be used to control the computing device 304.

In one example, as shown in FIG. 3b, the user dashboard display may be used to show digital versions 104' and 106' of conventional vehicle instruments 104 and 106. The user dashboard display may be arranged, for example, to show other instruments and interfaces, such as an air conditioning interface, a GPS interface, a vehicle data interfaces, and so on.

Figure 4:
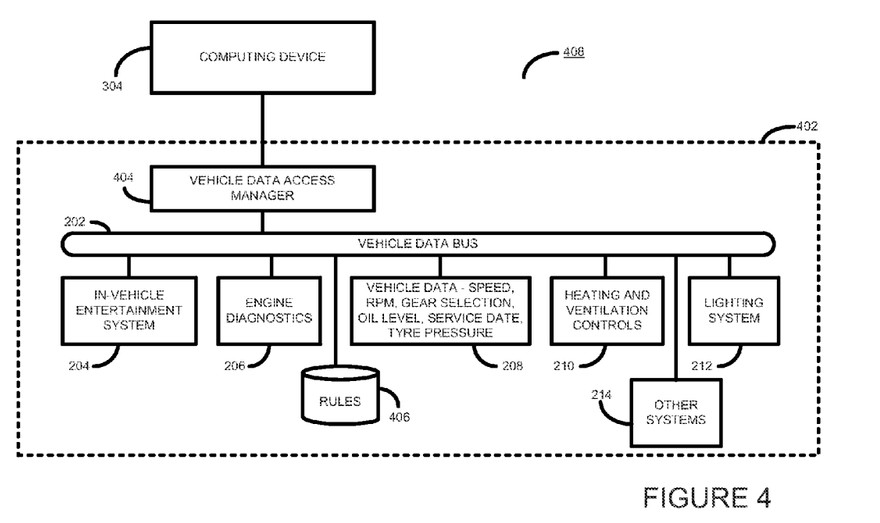
FIG. 4 is a simplified block diagram illustrating a vehicle management system according to an example of the present invention.

Referring now to FIG. 4, there is shown a simplified block diagram showing the removably connectable user computing device 304 connected to a vehicle management system 402. Connection to the vehicle management system 402 is controlled by a vehicle data access manager 404 which controls and manages access to the vehicle subsystems 204 to 214 via the vehicle data bus 202.

The vehicle data access manager 404 may, in one example, provide an industry standard interface that enables computing devices, such as the computing device 304, to access data from or send control signals to at least some of the vehicle subsystems 204 to 214. The industry standard interface may, for example, define a physical connector through which the computing device 304 connects to the vehicle management system 402. The industry standard interface may additionally or alternatively define, for example, one or more communication protocols defining how communications between the computing device 304 and the vehicle management system 402 are to take place. The vehicle management system 402 may, in some examples, use plug-and-play technology to facilitate connection by different makes and types of computing device 304. Connection between the computing device 304 and the vehicle data access manager 404 may be made in any appropriate manner including, wired or wireless connection.

In addition to the vehicle subsystems 204 to 214 mentioned above, the vehicle management system 402 additionally includes a rules data store 406. The rules data store 406 stores a set of rules that govern the way the computing device 304 handles interactions with the vehicle subsystems 204 to 214, as well as governing how the computing device 304 displays data received from the vehicle subsystems 204 to 214, as will be described further below.

Figure 5:
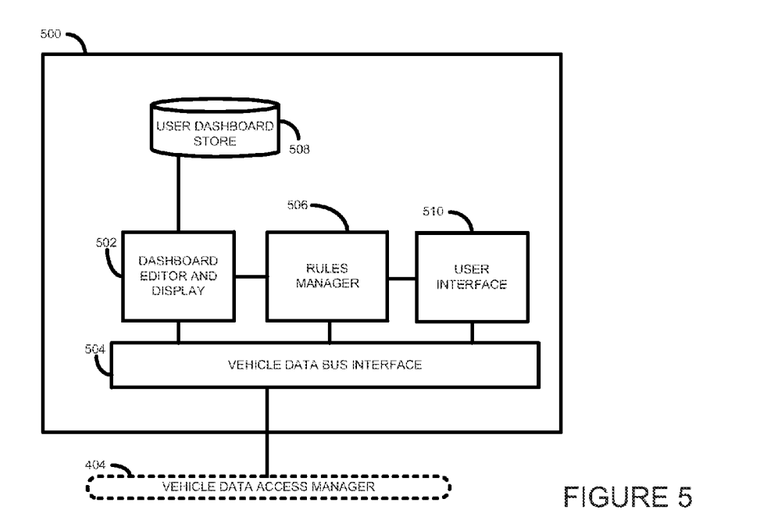
FIG. 5 is a simplified block diagram illustrating a user dashboard module according to an example of the present invention.
Figure 6:
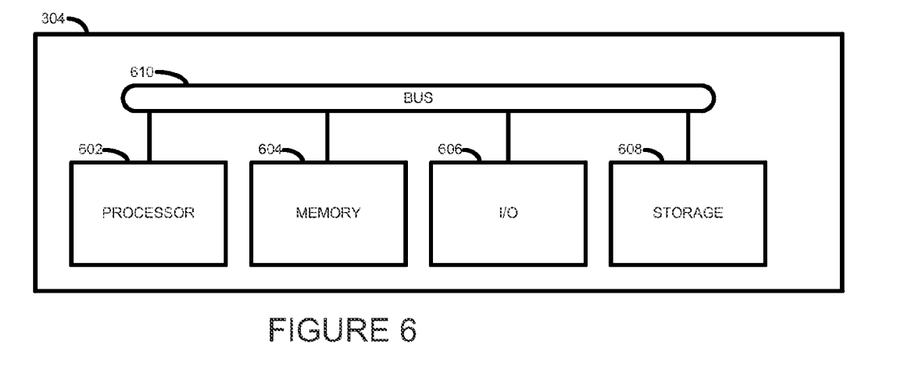
FIG. 6 is a simplified block diagram of an implementation of a user dashboard module according to an example of the present invention.

Referring now to FIG. 5, there is shown a simplified block diagram outlining a user dashboard module 500 of the user computing device 304. In one example the user dashboard module is provided by a computer program stored, as described with additional reference to FIG. 6. The computer program is stored in a memory 604. A processor 602 is coupled to the memory 604 via a bus 610 and executes the computer-readable instructions of the computer program to provide the described user dashboard functionality as described in greater detail below. An input/output module 606, also coupled to the bus 610 enables the processor to send data to and/or receive data from, for example, a user interface of the computing device 304 or from sources external thereto. A persistent storage module 608, also coupled to the bus 610 enables data to be stored and retrieved by the processor 602.

Figure 7:
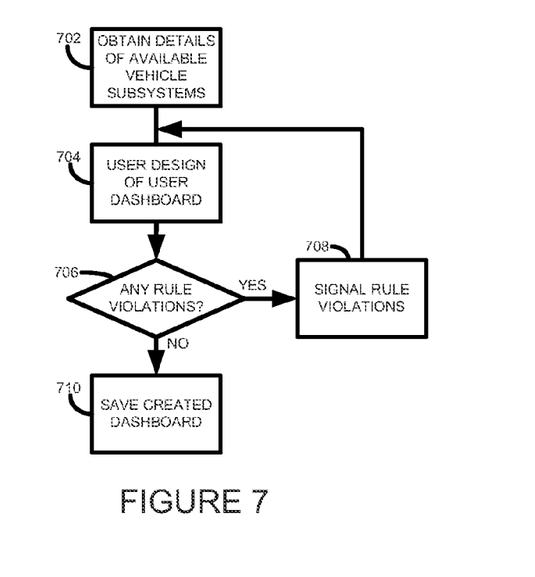
FIG. 7 is a simplified flow diagram outlining example method steps performed by a user dashboard module according to an example of the present invention.

Operation of the user dashboard module 500, according to examples of the present invention, will now be described below with additional reference to FIG. 7. A dashboard editor and display module 502 enables a user of the computing device 304 to generate a user dashboard on the display 306 of the computing device or on the external display 306. The dashboard editor and display module 502 obtains (702), via a vehicle data bus interface 504 details of which vehicle subsystems are enabled to provide status data and/or to receive control signals to the user dashboard module 500.

In one example, the vehicle data bus interface 504 may be provided in the form of an application programming interface (API). The vehicle data bus interface may, for example, translate data and messages sent from the user dashboard module 500 into a format understandable by the vehicle management system 402, and also translate data and messages sent from the vehicle management system 402 into a format understandable by the user dashboard module 500.

The dashboard editor and display module 502 provides a suitable environment to enable a user to create (704) a user dashboard on the computing device 304 in any suitable manner. The dashboard editor and display module 502 may, as described further below, be subsequently used to display a user dashboard.

In one example, the dashboard editor and display module 502 provides a graphical user interface (GUI) through which a user can create a new, or edit an existing, user dashboard. When creating a new user dashboard the GUI allows the user to select which vehicle data and/or controls they wish to display on the display element 306 or 306'. Through the GUI the user may then define specific parameters that define how the visual aspects of the user dashboard are to be displayed. For example, a user may select to display the current vehicle speed on the display element 306 or 306'. The vehicle speed may be displayed, for example, using an analogue or digital instrument display having user defined parameters defining; instrument shape; style; size; position; color; brightness; behavior; display units (e.g. MPH or KPH); etc. The user may also select to display a vehicle subsystem's interface on the display element 306 or 306' and may select parameters defining, for example, interface shape, size, style, size, position, color, brightness, input control functionality, display units, etc.

The characteristics of the user dashboard may be recorded in a dashboard display definition using any suitable format, for example, using HTML, XML, or any other suitable open or proprietary format. The dashboard definition may be stored, for example, in a file or other suitable data structure or data container.

The user dashboard module 500 further includes a rule management module 506. The rule management module 506 obtains a set of rules that impose restrictions on different aspects of the user defined dashboard created through the dashboard editor and display module 502. In the current example the rules manager 506 obtains, through the vehicle data bus interface 504, a set of rules from the rules data store 406 in the vehicle management system 402. The rules manager 506 stores the rules in an appropriate rules data store (not shown).

The rules in the rules data store 406 may impose, for example, the type of vehicle data displayable on a display element 306 or 306', and also the type of vehicle subsystems controllable through the computing device 304. For example, the rules in the rules data store 406 may prevent engine speed data from being displayed, may impose a minimum display size of a speedometer instrument, may impose where an instrument may be placed on a display, may impose a style requirement, on so on.

The rules may be modifiable by the computing device 304, for example, in exchange for a license key or unlock code being provided. For example, a user may purchase a license key or unlock code giving the user the right to display engine speed data and may provide the key or code to the vehicle management system 402 via the computing device 304. In one example the rules stored by the rules manager 506 are modifiable. In a further example the rules stored in the vehicle rules data store 406 are modifiable.

During the user design phase, and/or upon completion of the user design phase, the dashboard editor and display module 502 determines (706), whether the user dashboard display definition complies with the current rules stored by user dashboard module 500. This may be achieved, for example, by obtaining the current rules from the rules manager 506 and determining whether the current user dashboard display definition conforms to the obtained rules.

If any violations of the rules are determined they are indicated (708) to the user in an appropriate manner. For example, one or more messages could be displayed to the user indicating which rules have been violated and what corrections are required in order for the rules to be conformed with. In an alternative example, the dashboard editor and display module 502 may automatically make changes to the user dashboard display definition to bring it into conformity with the rules. Such modifications may include, for example, changing the display location of a display element, changing the size of a display element, changing characteristics of a display element, etc.

Once a user dashboard display definition has been created in conformity with the rules it may be saved (710) in a user dashboard store 508 for subsequent display.

Figure 8:
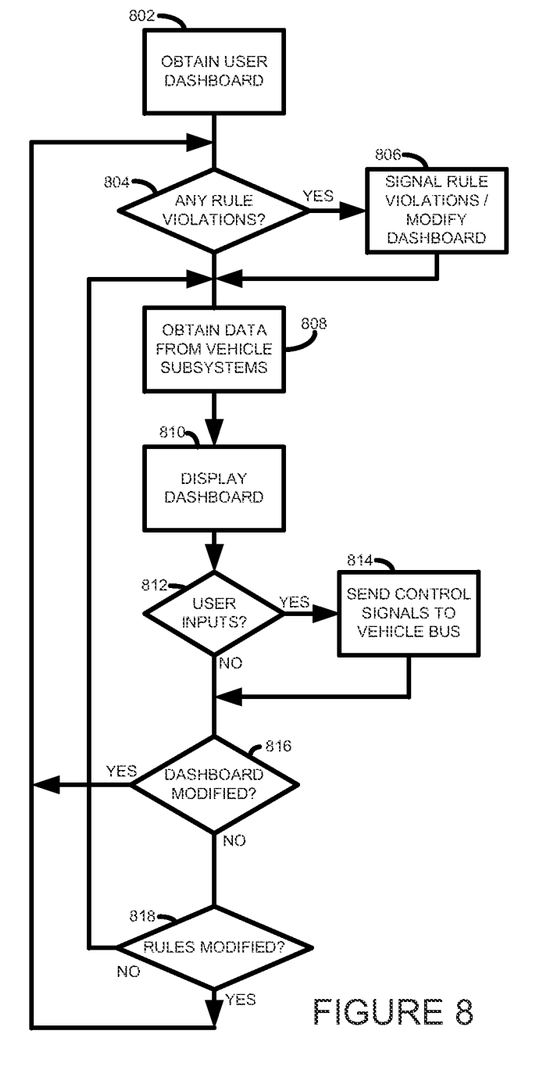
FIG. 8 is simplified flow diagram outlining example method steps performed by a user dashboard module according to an example of the present invention.

Further operation of the user dashboard module 500 will now be described with further reference to the flow diagram of FIG. 8.

At 802 the dashboard display module 510 obtains a user dashboard display definition. The user dashboard may, for example, be a user dashboard display definition created by the dashboard editor and display module 502 and stored in the user dashboard store 508, or may be a user dashboard display definition obtained from an external source, such as by downloading it from an Internet site.

The dashboard editor and display module 502 verifies (804) that the obtained user dashboard display definition complies with the set or sets of rules obtained by the rules manager 506. If any violations of the rules are determined to have occurred the dashboard editor and display module 502 indicates (806) details of the violation(s) to the user of the computing device 304. In a further example, the dashboard display module modifies (806) the user dashboard display definition to be in conformance with the obtained rules.

At 808 the dashboard editor and display module 502 obtains any data to be displayed, as defined by the user dashboard display definition, from the vehicle management system 402 through the vehicle data bus interface 504. The dashboard editor and display module 502 then displays (810) the obtained vehicle data in accordance with the user dashboard display definition.

A user interface module 510 repeatedly determines (812) whether any user inputs have been received from the computing device 304. The user inputs may, for example, be received at the user interface module 510 as a result of a user interaction with the computing device 304 or as a result of a user interaction with a display element, such as display 306 or 306'. If any user inputs are detected that relate to user inputs intended to control one of the vehicle subsystems, the user interface module 510 sends (814) appropriate control signals or messages to the vehicle management system 402 through the vehicle data bus interface 504.

In one example the dashboard editor and display module 502 allows the modification of a user dashboard display definition whilst the user dashboard is being displayed. In this way, a user may modify the user dashboard display definition by, for example, moving, resizing, hiding, changing, etc., dashboard items or objects displayed by the computing device 302 through the user interface module 510. For example, the display 306 or 306 may provide control signals to the user interface module 510 in response to a user touching the display. At 816 the dashboard editor and display module 502 determines whether any modifications have been made to the user dashboard display definition. If any changes have been made the dashboard editor and display module 502 checks (804) to ensure that the modifications conform to the current rules.

At 818 the dashboard editor and display module 502 determines whether any changes in the rules have been made. This may be achieved in any suitable manner, for example, by interrogating the rules manager 506, or by checking an appropriate flag set by the rules manager 506. If no rule changes have been determined, the dashboard editor and display module 502 continues to obtain and display data as described above.

If, however, a change in the rules has been detected the dashboard editor and display module 502 verifies (804) that the user dashboard display definition conforms to the updated rules.

Changes to the rules may occur for a number of different reasons. For example, some rules may be applicable only during a predetermined time period or periods. For example, one rule may place restrictions on the brightness of all or part of the user dashboard during the hours of darkness. Other rules, for example, may place restrictions based on the determined geographic location of the vehicle. For instance, if a vehicle passes from a country where the law requires vehicle speeds to be displayed in miles per hour to a country where the law requires vehicle speeds to be display in kilometers per hour such a rule change may be determined, through use of appropriate geo-location devices (not shown) such as global positioning system (GPS) devices. In this way, the rules manager may, for example, cause a user dashboard display to automatically switch the display format of a speedometer instruments to display the vehicle speed in kilometers per hour instead of miles per hour.

In a further example, additional or alternative sets of rules may be obtained from other sources, such as from a web site, or from a set of rules stored in a storage medium such as a compact disk (CD), digital versatile disk (DVD), flash memory, or the like. The obtained set or sets of rules are stored by the rules manager 506 in an appropriate rule data store (not shown). The additional sets of rules may include, for example, a set of rules relating to local laws based on the geographical location of the vehicle. Where there are two or more different sets of rules the rules manager 506 determines a prioritization between the different sets of rules. For example, the rules manager 506 may determine that rules relating to local laws take precedence over rules provided by the vehicle manufacturer and stored in the vehicle management system 402 rules data store 406.

In a further example, communications between the user dashboard module 500 and the vehicle management system 402 may be encrypted, so that communication with the vehicle management system 402 may only take place between a 'paired' or authorized user dashboard module 500 or computing device 304. Pairing or authorization may, for example, require the user of the computing device 304 to enter or to provide an authorization code derived, for example, by performing a cryptographical operation on the vehicle identification number (VIN) or other unique or substantially unique vehicle identification code. In this way, the manufacturer may have a reasonable degree of confidence that the user dashboard module 500 on the computing device 304 is enforcing the rules.

Figure 9:
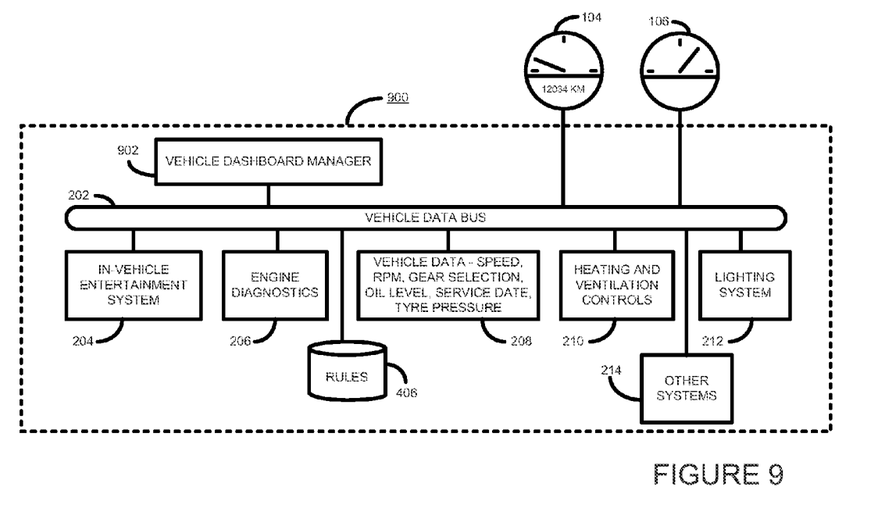
FIG. 9 is a simplified block diagram illustrating a portion of a vehicle dashboard according to an example of the present invention.
Figure 10:
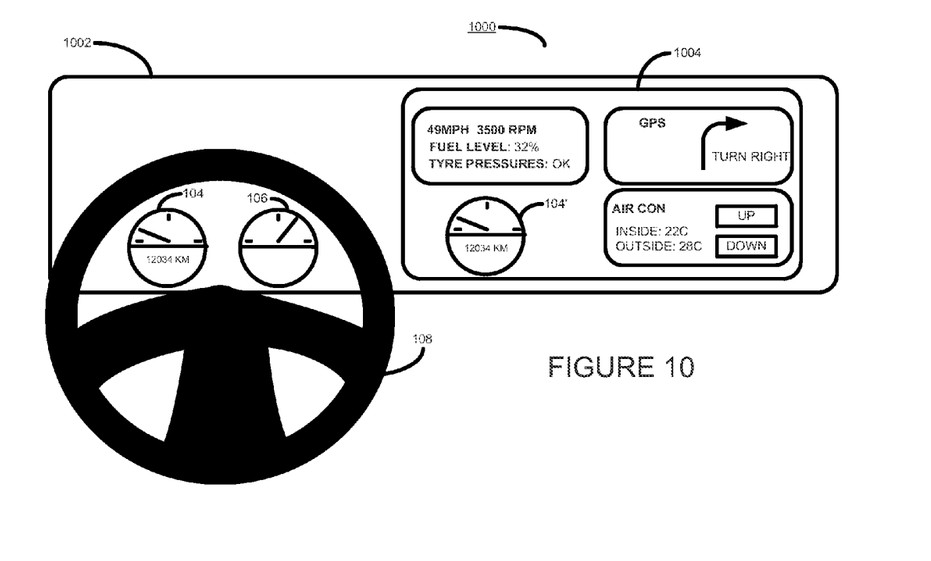
FIG. 10 is a simplified block diagram of a vehicle management system according to an example of the present invention.

In a yet further example a vehicle management system 900, as shown in FIG. 9, is provided. The vehicle management system 900 includes a vehicle dashboard manager 902 to which may be connected a user display, such as a display 1004. The user display 1004 may, for example, be a touch-sensitive display, an LOC display, a flexible display, or any other suitable display type. Connection of the user display 1004 may, for example, be by way of any suitable connection means including both cable and wireless connections. The user display 1004 may be removably positioned in a vehicle, for example, on a vehicle dashboard 1002 in any suitable position, as shown in FIG. 10.

In at least one example one or more conventional vehicle instruments or control interfaces may be provided in addition to the vehicle instruments and/or control interfaces displayed on the user display 1004. For example, as shown in FIGS. 9 and 10, conventional instruments 104 and 106 are provided. Digital representations of the conventional instruments may also be provided on the user display 1004, as shown by digital instrument 104'.

The vehicle dashboard manager 902 may provide substantially the same or similar functionality to that provided by the user dashboard module 500 as described above.

It will be appreciated that examples of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Accordingly, examples provide a program comprising code for implementing a system or method as claimed in any preceding claim and a machine readable storage storing such a program. Still further, examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. Apparatus for displaying a dashboard display in a vehicle, the apparatus comprising:
  a vehicle data bus interface for communicating with vehicle subsystems of a vehicle management system;
  a rules store for storing a set of dashboard display rules;
  a dashboard display module for:
    obtaining a dashboard display definition;
    determining whether the dashboard display definition is in compliance with the dashboard display rules;
    obtaining, where it is so determined, data from one or more of the vehicle subsystems in accordance with the dashboard display definition; and
    displaying the obtained data in accordance with the dashboard display definition.

2. The apparatus of claim 1, wherein the dashboard display module is further configured to, where it is determined that the dashboard display definition is not in compliance with the dashboard display rules, modify the dashboard display definition to bring it into conformity with the dashboard display rules.

3. The apparatus of claim 1, wherein the vehicle data bus interface communicates with the vehicle subsystems through a vehicle data access manager of the vehicle management system.

4. The apparatus of claim 1, wherein at least one set of rules stored in the rules store are obtained from the vehicle management system.

5. The apparatus of claim 1, wherein at least one set of rules stored in the rules store are obtained from other than the vehicle management system.

6. The apparatus of claim 1, wherein the dashboard display module is further configured to obtain a geographical location of the vehicle and to determine compliance with at least some of the rules based on the obtained geographical location.

7. The apparatus of claim 1, further comprising a user interface module for receiving user inputs and for sending control signals in response thereto to at least one of the vehicle subsystems.

8. The apparatus of claim 1, wherein the apparatus is a computing device removably attachable to the vehicle.

9. The apparatus of claim 8, wherein the dashboard display is displayed on one of either a display element integral to the computing device or a display element external to the computing device.

10. The apparatus of claim 7, wherein the user interface module is configured to receive user inputs from at least one of the computing device, a display element integral to the computing device and a display element external to the computing device.

11. A computer implemented method of displaying a dashboard comprising:
 obtaining, by a processor, a dashboard definition file;
 determining, by the processor, whether the dashboard definition file complies with a set of dashboard display rules;
 obtaining, by the processor, vehicle data from a vehicle management system in accordance with the dashboard definition file; and
 displaying, on a display element coupled to the processor, the vehicle data in accordance with the dashboard definition file.

12. The method of claim 11, further comprising receiving, at the processor, user inputs associated with a vehicle subsystem, and sending control signals based on the receive inputs to the associated vehicle management system.

13. The method of claim 11, further comprising, receiving, at the processor, user inputs intended to modify the dashboard definition file; and determining, by the processor, whether the intended modifications comply with the set of dashboard display rules.

14. A vehicle management system comprising:
 a vehicle data bus;
 a plurality of vehicle subsystems connected via the vehicle bus;
 a rules store for storing a set of dashboard display rules;
 a dashboard display module for:
  obtaining a dashboard display definition;
  determining whether the dashboard display definition is in compliance with the dashboard display rules; and
 a vehicle data access manager configured to:
  receive a request to obtain data from a vehicle subsystem in accordance with the dashboard display definition, the request coming from a device external to the vehicle management system;
  determine whether the request is acceptable;
  obtaining, where it is so determined, the requested data; and
  sending the obtained data to the device external to the vehicle management system.

15. The vehicle management system of claim 14, wherein the vehicle data access manager is further configured to:
 receive control signals intended to be sent to one of the vehicle subsystems;
 determine whether control signals may be sent to the vehicle subsystem; and
 sending, where it is so determined, the received control signals to the appropriate vehicle subsystem.

16. The method of claim 11, wherein the set of dashboard display rules are stored in a rules store and are obtained from the vehicle management system.

17. The method of claim 11, further comprising obtaining a geographical location of a vehicle in which the vehicle management system resides and determining compliance with at least some of the dashboard display rules based on the obtained geographical location.

18. The vehicle management system of claim 14, wherein the set of dashboard display rules stored in the rules store are obtained from the vehicle management system.

19. The vehicle management system of claim 14, wherein the dashboard display module is further obtains a geographical location of the vehicle in which the vehicle management system resides and determines compliance with at least some of the dashboard display rules based on the obtained geographical location.

20. The vehicle management system of claim 14, wherein the dashboard display module further, where it is determined that the dashboard display definition is not in compliance with the dashboard display rules, modify the dashboard display definition to bring it into conformity with the dashboard display rules.

* * * * *